(No Model.)
J. E. JEFFORDS.
PRESERVING VESSEL.
No. 302,141. Patented July 15, 1884.
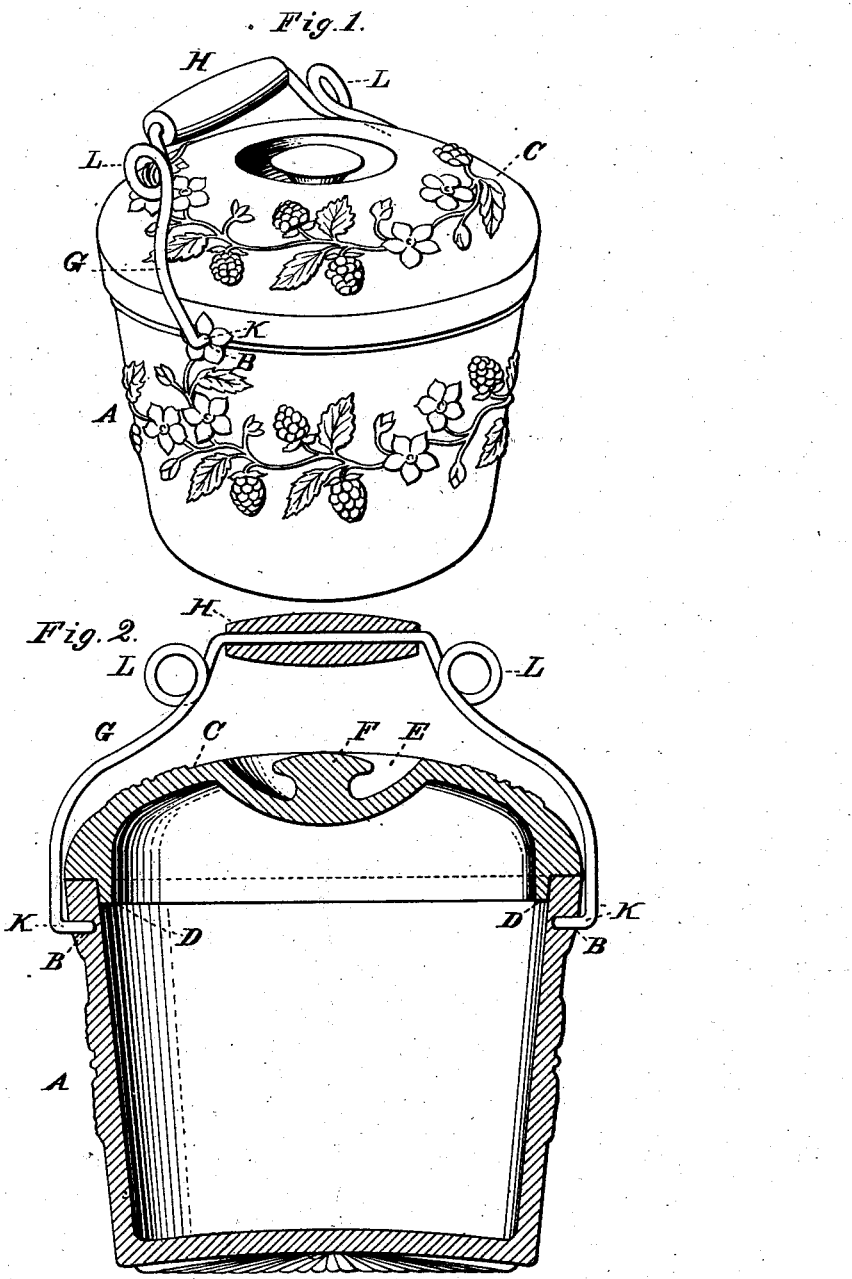
WITNESSES
Villette Anderson.
Philip C. Masi.
INVENTOR
John E. Jeffords
by Andrew Smith
his ATTORNEYS

UNITED STATES PATENT OFFICE.

JOHN E. JEFFORDS, OF PHILADELPHIA, PENNSYLVANIA.

PRESERVING-VESSEL.

SPECIFICATION forming part of Letters Patent No. 302,141, dated July 15, 1884.

Application filed April 18, 1884. (No model.)

*To all whom it may concern:*

Be it known that I, JOHN E. JEFFORDS, a citizen of the United States, and a resident of Philadelphia, in the county of Philadelphia and State of Pennsylvania, have invented a new and valuable Improvement in Preserving-Vessels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of this invention, and is a perspective view. Fig. 2 is a vertical section.

This invention has relation to improvements in earthenware packages for holding mince-meat, jellies, and other articles for sale; and it consists in the construction and novel arrangement of devices, as will be hereinafter more fully set forth and claimed.

In the accompanying drawings, the letter A designates the earthenware pail, which is fire-proof. It is usually ornamented with raised flowers and leaves in wreath form around the outer surface, and near its upper edge is provided at diametrically-opposite points with the recess bearings or perforations B.

C represents the cover, which is of well-arched form, being so constructed in order to give it strength to withstand casual shocks and jarring movements in transportation. The cover is formed with a lip, D, to fit within the rim of the vessel, and the upper central portion of the cover is sunken, as at E. From the bottom of the sunken portion E rises the knob F to the height of the upper surface of the cover, but not above it. By means of the depression E the knob is protected in a great measure from injury. The cover is also usually ornamented with raised figures of flowers, leaves, &c.

The bail G is made of wire, and may be nickel-plated or turned. The middle portion of the bail is usually provided with a wooden sleeve-handle, H; but it may be used without this handle, if desired. The ends K of the bail are turned inward to engage the bearings B of the vessel. In the branches of the bail, near the ends of the middle or handle portion, are made spiral spring-coils L, which are designed to hold the terminal catches of the bail to their engagement with the vessel.

After the vessel has served its purpose as a package for mince-meat, jellies, &c., it will serve as a convenient household-vessel for holding various articles used in the store-room or for cooking purposes.

The pail may be made in reversed form, larger at the bottom than at the top, having the same cover, decoration, and bail.

I am aware that various kinds of spring-bails have been used on vessels, and that it is not new to provide a bail with lateral and horizontal spring-loops for pressing upon a cover.

Having described this invention, what I claim, and desire to secure by Letters Patent, is—

The combination, with a vessel having the recesses B B, of the bail G, having the inwardly-bent ends K, to engage the said recesses, the upwardly and inwardly curved branches, having the spring-loops L L, arranged as shown, and the horizontal handle portion, arranged a sufficient distance above the cover of the vessel for the insertion of a hand or arm, and provided with the wooden sleeve H, substantially as specified.

In testimony whereof I affix my signature in presence of two witnesses.

JOHN E. JEFFORDS.

Witnesses:
JOHN FITZPATRICK,
WM. COX.